Figure 1:
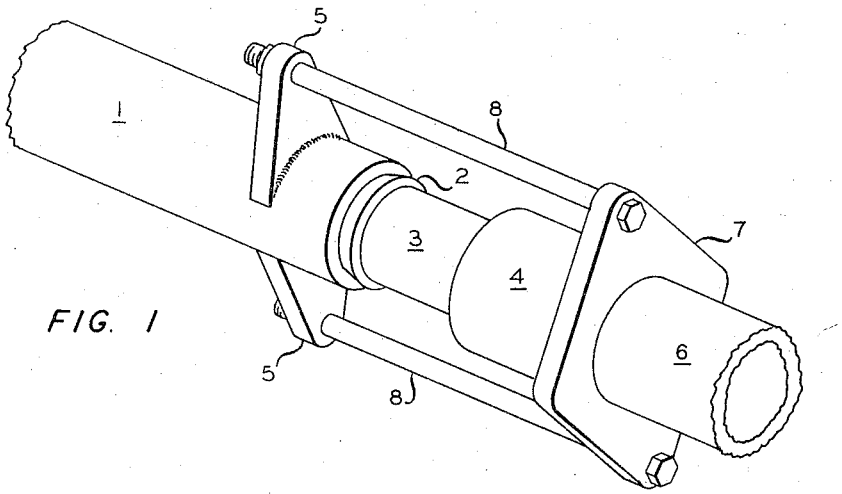

Feb. 28, 1967  R. B. FERGUSON  3,306,635
CONDUIT LINING
Filed Jan. 12, 1962

INVENTOR.
R. B. FERGUSON
BY
*Young + Rugg*
ATTORNEYS

United States Patent Office 3,306,635
Patented Feb. 28, 1967

3,306,635
CONDUIT LINING
Robert B. Ferguson, Alvin, Tex., assignor to Phillips
Petroleum Company, a corporation of Delaware
Filed Jan. 12, 1962, Ser. No. 165,883
7 Claims. (Cl. 285—55)

This invention relates to conduit lining. In one of its aspects, the invention relates to method and apparatus for lining a conduit with plastic wherein a liner end is secured to the corresponding conduit end by a novel fitting and wherein void spaces between coupled sections of the conduit are filled. In another aspect, the invention relates to method and apparatus for securing the end of a plastic liner to the corresponding end of the conduit which is lined by means of a hollow, tapered, cylindrical fitting. In still another aspect, the invention relates to the method and apparatus for supporting a plastic liner through the coupled junction of two conduit sections by substantially filling the normally void space therebetween.

The value and utility of a plastic-lined conduit or pipe is readily recognized in the art. In the past, such lined conduits or pipes have been unsatisfactory for one or more reasons. For example, various lined pipes have been available wherein the lining material is bonded to the inner surface of the pipe. These products are generally expensive and, further, a satisfactory joint is difficult to achieve, especially under field conditions.

Accordingly, it is an object of my invention to provide method and aparatus for lining a conduit wherein satisfactory joints can be achieved under difficult conditions. It is another object of my invention to provide method and apparatus for producing an inexpensive plastic-lined conduit. It is still another object of my invention to provide method and apparatus for terminating the lined section of a conduit.

Other aspects, objects and the several advantages of my invention will become apparent to one skilled in the art upon study of this disclosure, the drawing, and the appended claims.

According to my invention, there are provided a method and apparatus for lining a conduit which comprises introducing into a first conduit zone a relatively loose fitting plastic liner, securing a first end of said liner to the corresponding end of said first conduit zone, coupling a second conduit zone to a second end of said first conduit zone, and substantially filling any residual space outside said liner and between the coupled ends of said conduit zones. There is further provided a plastic-lined conduit comprising two sections of conduit, a coupling joint restraining said two sections against axial movement relative to each other, a continuous plastic liner fitted relatively loosely within said two sections, and an annular ring substantially filling the space bounded by said two sections, said joint, and said liner. There is further provided a plastic-lined conduit comprising a section of conduit, a continuous plastic liner fitted relatively loosely within said section, and an end fitting having one outer end thereof tapered and having an open inner cross-section substantially identical to the inner cross-section of said liner, said fitting being forceably held within an end of said liner so as to clamp said end of said liner between said end of said section and said tapered end.

Figure 2:
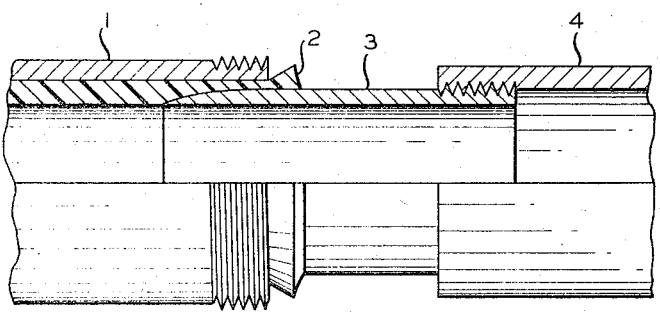
Figure 3:
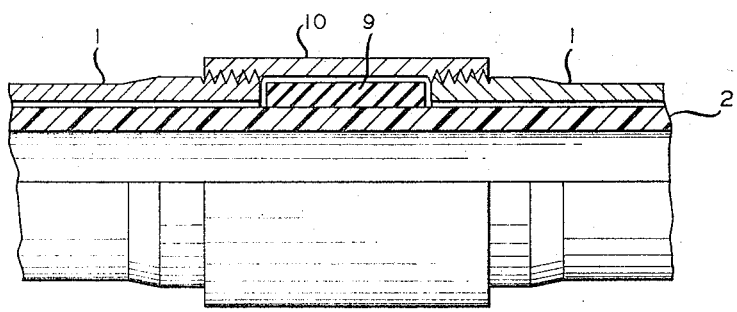

In the drawing, FIGURE 1 is an isometric view of a presently preferred embodiment of an end fitting according to my invention. FIGURE 2 is a sectional view of the lined conduit portion of FIGURE 1. FIGURE 3 is a sectional view of a presently preferred embodiment of a pipe joint according to my invention.

Referring now to the drawing in detail and especially to FIGURES 1 and 2, there is seen a pipe or conduit 1 which is to be lined according to my invention. A plastic liner having an outer diameter slightly smaller than the inner diameter of pipe 1 is inserted into the pipe so that the end of the liner protrudes slightly from the end of the pipe. An externally-tapered nipple 3 with its attached pipe collar 4 is inserted into the end of the liner. Lugs 5 are secured near the end of pipe 1 as by welding. An unlined section of pipe 6 is then threaded into collar 4, and a force plate 7, previously slipped over the end of pipe 6, is pushed up against the end of collar 4. Suitable bolts 8 are then used to pull force plate 7 toward lugs 5, causing tapered nipple 3 to expand the protruding end of liner 2 against the inside wall of pipe 1. Thus, the pipe has been easily lined and a simple termination of the liner has been effected. FIGURE 3 shows a presently preferred section through a joint in the lined pipe according to my invention. My lined pipe is readily assembled by welding, gluing, or otherwise suitably joining sections of liner. A piece of pipe 1 is then slid into position over the extended end of the liner until it abuts the preceding section of pipe. A collar or coupling 10, which was placed into position before adding the new section of pipe, effects engagement of the pipe joint ends. A fill ring 9 is placed around the outside of the liner in order to fill the void which would normally be present in such a coupling. This ring, according to one embodiment of my invention, can comprise a layer of rubber such as rubber tape. According to another embodiment of my invention, this ring 9 comprises an annular steel ring. According to the latter embodiment, both the ring 9 and the collar 10 are, of course, slid onto the extended end of the liner before placing the new section of pipe thereon. I prefer that the joints made up as according to FIGURE 3 be not made too tightly. This serves the dual advantage of allowing visual localization of possible future leaks and of allowing air trapped between the liner and pipe wall to be vented upon pressuring the installed pipe. It is further preferred that the liner be cooled, for example, as by flushing with cooled water, prior to fastening both ends of the liner as in FIGURES 1 and 2.

The following specific examples will serve to more fully illustrate my invention.

*Example 1*

A first test was made to determine whether a polyethylene liner would expand out against a pipe when pressure was applied or would split without allowing the steel pipe to take up the pressure. The test unit was a two foot 2½" EUE well tubing sub. Three 1" square nuts were welded to end end of the sub. They were spaced about 120° apart around the sub. The test piece of 2" nominal polyethylene pipe was inserted into the sub and a 2" to 1½" swage was nosed into each end of the liner. The liner was about 1" longer than the tubing sub. A 2" collar was connected to each swage and a short nipple was screwed into the collar. Two-inch Dresser flanges were then slipped over the nipples and 10″ by ¾″ bolts were inserted through the 1″ nuts and the Dresser sleeve flange and ¾″ nuts were used to tighten the swages into the liner. The swages were driven in until only a very small lip of liner remained visible outside the tubing sub. A collar and bull plug were used to seal one end of the test unit and a 2″ to 1″ swage with a bleeder valve attachment was used to reduce to 1″ to connect a high pressure hose and a gauge. The unit was pressured to 1000 p.s.i. three times with no visible leaking.

The pressure was bled down and the unit was then dismantled. The liner was expanded out firmly against the wall of the 2½″ tubing. To remove the liner, it was necessary to cut off the lip on one end of the liner and run cold water through it while two men pulled with pliers on the other lip. When the liner was removed, hole or split was found. Although the liner had expanded beyond its normal diameter, it did partially draw up and approach its original size. After six hours it was possible to slip the test liner into the tubing easily again.

*Example II*

Three lengths of 2″ Schedule 80 polyethylene pipe were butt welded together and the two outside beads were trimmed off. The resulting 67 foot piece of plastic pipe was put through a 30 foot joint of 2½″ EUE tubing. Three feet of plastic was extended from one end of the tubing to allow a two foot tubing sub to be put over the extended piece and the end connections put on. Electricians' rubber tape was wrapped around the plastic so the tape would fill the recess in the collar when the joint was made up. (See FIGURE 3.) The collar was then screwed on and the second joint of 2½″ EUE tubing was slid over the plastic and screwed into the collar. The connections were made up snug but not tight so that, if the plastic split, the leak could be detected. Two foot tubing subs were then put on each end over the extending plastic and the connections to the joints of tubing were taped and secured as before. The tubing subs had been prepared by welding three 1″ nuts around the upset. The plastic was sawed off about 1″ from the end of the subs. The total length of plastic liner used was 65.24 feet.

Two regular 2″ to 1½″ swages were inserted, small end first, into the ends of the plastic and the Dresser flanges were put on and tightened. When the ends of the plastic flared, the regular swages were removed and the machined swages were inserted into the flared ends of the plastic. The machined swages were then drawn into the plastic and the 2½″ tubing. The bolts were tightened until the tapered part of the swages were inside of the 2½″ tubing. The tightening of the bolts had compressed about 1″ of plastic into each end of the tubing. This helped seat the seal also takes care of some of the contraction due to a drop in temperature.

The tapered nipples comprised two Exner-Dodge extra heavy 2″ to 1½″ swages machined out to a constant I.D. of 1-14/16″. The outer surface was sanded with emery cloth to remove the mottled finish and ensure a smooth seal. The result was a short length of extra heavy pipe whose O.D. varies from 2⅜″, on the large threaded end, to 2″ on the cut-off end with the I.D. constant at 1 15/16″.

The test unit was installed in a 2½″ well injection line by swaging from 2½″ to 2″ and putting on the mating halves of the unions on the test unit. The unit was then placed in the line and the unions were tightened. Nuts on the end connections were then given several more turns to take up any slack. A bleeder valve on one of the shut-in wells was opened to allow the water to circulate through the line and the main gate valve on the line was opened. After allowing a short time for the water to fill the drained portion of the line a gauge was connected to the bleeder. This closed in the line putting the full line pressure on the installation. The gauge reading rose from 0 to 1200 p.s.i. in about two minutes and remained there. There were no visible leaks. The unit was then buried approximately 18″ under the surface. The volume of fluid passing through the test section was 204 barrels per day. This is a fluid velocity of 0.152 feet per second at a pressure of 1200 p.s.i. at the injection well head. The installation was observed in satisfactory operation for a period of 79 days.

Annular steel rings shaped so as to fill the void between the pipe ends at a coupling joint are now preferred over the use of rubber tape. Although polyethylene pipe has been described as the liner in the preceding examples, it is obvious that the invention is not limited thereto, but rather is applicable to any suitable plastic pipe, preferably thermoplastic, which can be readily joined in the field as by heat-welding, gluing, or other suitable means. Further, it is contemplated that joints in the plastic liner need not be made up in the field according to my invention, but can be made by the fabricator, i.e., a long length of plastic liner can be fabricated and then carried to the field, and the steel or other metal pipe installed on the liner in the field.

Although I have shown, in FIGURES 1 and 2, an end of the liner protruding from the pipe, this is merely for ease of installation. The liner can, for example, be installed so as to be flush with the end of the pipe.

I further contemplate that pipe fittings, such as T's, L's, unions, and other fittings can be provided with a plastic liner suitable for joining to the lined conduit of my invention.

The annular ring 9 preferably substantially fills the void between the pipe ends, the coupling, and the liner to prevent failure of the liner by extrusion thereinto. Accordingly, the ends of pipes 1 are preferably squared off and ring 9, especially when made of a hard metal such as steel, is also squared off to allow close fit with the pipe ends.

Reasonable variation and modification are possible within the scope of this disclosure, the drawing, and the appended claims to the invention, the essence of which is that there is provided method and apparatus for lining a conduit wherein the liner is inserted into the conduit to allow a relatively loose fit, the liner is supported at joints in the conduit to prevent extrusion of the liner into conduit voids, and the liner is terminated by use of a tapered end fitting.

I claim:
1. A plastic-lined rigid conduit comprising two sections of rigid conduit, a coupling joint restraining said two sections against axial movement relative to each other, a continuous plastic liner fitted relatively loosely within said two sections, and an annular ring substantially filling the space bounded by said two sections, said joint, and said liner.

2. A plastic-lined rigid metallic conduit comprising two sections of rigid metallic pipe, a metallic coupling threadedly engaging one end of each of said two sections at outer surfaces thereof, a one-piece semi-rigid plastic liner fitted relatively loosely within said two sections, and an annular ring substantially filling the space bounded by said two sections, said coupling, and said liner.

3. The conduit of claim 2 wherein said liner comprises polyolefin pipe.

4. The conduit of claim 3 wherein said polyolefin is polyethylene.

5. The conduit of claim 2 wherein said ring comprises rubber.

6. The conduit of claim 2 wherein said ring comprises metal.

7. A plastic-lined rigid conduit comprising two sections of conduit, means restraining said two sections against axial movement relative to each other, a continuous plastic liner fitted relatively loosely within said two sections, and means substantially filling the space bounded by said two sections, said restraining means, and said liner.

(References on following page)

References Cited by the Examiner

UNITED STATES PATENTS

| | | | |
|---|---|---|---|
| 714,903 | 12/1902 | Hunds | 29—421 |
| 934,687 | 9/1909 | Mueller | 285—371 X |
| 1,005,466 | 10/1911 | Priest | 285—371 |
| 1,134,930 | 4/1915 | Theriart | 285—138 |
| 1,577,950 | 3/1926 | Butler | 285—138 |
| 1,584,394 | 5/1926 | Munley | 285—423 X |
| 1,806,710 | 5/1931 | Ross | 285—397 |
| 1,975,269 | 10/1931 | Gray | 285—138 |
| 1,980,451 | 11/1934 | Taylor | 285—114 |
| 2,300,648 | 7/1942 | Carlberg | 285—55 X |
| 2,907,103 | 10/1959 | Lewis | 29—421 |
| 2,982,311 | 5/1961 | Haskell | 285—55 |
| 2,998,984 | 9/1961 | Cressel | 285—55 |
| 3,018,120 | 1/1962 | Vann | 285—55 |
| 3,020,068 | 2/1962 | Costanga | 285—55 |
| 3,047,937 | 8/1962 | De Veccli | 285—55 |
| 3,068,026 | 12/1962 | McKamey | 285—138 |
| 3,120,966 | 2/1964 | Lyon | 285—149 X |
| 3,160,425 | 12/1964 | Sinnott | 285—55 |

FOREIGN PATENTS

| | | |
|---|---|---|
| 1,197,381 | 11/1959 | France. |
| 1,049,173 | 1/1959 | Germany. |
| 810,400 | 3/1959 | Great Britain. |
| 37,517 | 9/1914 | Sweden. |

CARL W. TOMLIN, *Primary Examiner.*

THOMAS J. HICKEY, *Examiner.*

R. GIANGIORGI, *Assistant Examiner.*